US009871850B1

(12) United States Patent
Brandwine et al.

(10) Patent No.: US 9,871,850 B1
(45) Date of Patent: Jan. 16, 2018

(54) ENHANCED BROWSING USING CDN ROUTING CAPABILITIES

(71) Applicant: Amazon Technologies, Inc., Reno, NV (US)

(72) Inventors: Eric Jason Brandwine, Haymarket, VA (US); Bradley Eugene Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 699 days.

(21) Appl. No.: 14/311,167

(22) Filed: Jun. 20, 2014

(51) Int. Cl.
H04L 29/08 (2006.01)

(52) U.S. Cl.
CPC .......... *H04L 67/10* (2013.01); *H04L 67/1002* (2013.01); *H04L 67/1008* (2013.01); *H04L 67/1019* (2013.01)

(58) Field of Classification Search
CPC . H04L 67/1002; H04L 67/10; H04L 67/1008; H04L 67/1019
See application file for complete search history.

(56) References Cited

U.S. PATENT DOCUMENTS

| | | | |
|---|---|---|---|
| 7,174,373 B1 * | 2/2007 | Lausier | H04B 7/1858 709/223 |
| 7,240,100 B1 | 7/2007 | Wein et al. | |
| 7,996,533 B2 | 8/2011 | Leighton et al. | |
| 8,332,484 B2 | 12/2012 | Afergan et al. | |
| 8,577,963 B2 | 11/2013 | Trahan et al. | |
| 8,706,860 B2 | 4/2014 | Trahan et al. | |
| 2002/0078174 A1 * | 6/2002 | Sim | G06F 17/30194 709/219 |
| 2003/0135509 A1 * | 7/2003 | Davis | H04L 63/0227 |
| 2008/0008089 A1 * | 1/2008 | Bornstein | H04L 29/06 370/227 |
| 2010/0088405 A1 | 4/2010 | Huang et al. | |
| 2011/0238646 A1 * | 9/2011 | Chamberlain | G06F 17/30864 707/706 |

(Continued)

FOREIGN PATENT DOCUMENTS

WO 2014019970 2/2014

OTHER PUBLICATIONS

Amazon Web Services, "Amazon CloudFront, Developer Guide", Nov. 11, 2013, pp. 1-280.

(Continued)

*Primary Examiner* — Saket K Daftuar
(74) *Attorney, Agent, or Firm* — Robert C. Kowert; Meyertons, Hood, Kivlin, Kowert & Goetzel, P.C.

(57) ABSTRACT

An edge node of a content delivery network (CDN) service receives a representation of a browsing request from a client-side component of a split-browser service (SBS). The SBS includes a browsing engine implemented at a provider network. The edge node determines whether content retrieval analysis of the browsing request is to be performed at the edge node. In response to a determination that content retrieval analysis of the browsing request is not to be performed at the edge node, the edge node uses a routing knowledge base of the CDN service to identify a network route to the SBS browsing engine and transmits the representation of the browsing request via the identified network route to the SBS browsing engine for content retrieval and related processing.

22 Claims, 9 Drawing Sheets

(56) References Cited

U.S. PATENT DOCUMENTS

| | | |
|---|---|---|
| 2012/0096546 A1 | 4/2012 | Dilley et al. |
| 2012/0209942 A1 | 8/2012 | Zehavi et al. |
| 2013/0191499 A1 | 7/2013 | Ludin et al. |
| 2013/0311605 A1 | 11/2013 | Richardson |
| 2014/0052811 A1* | 2/2014 | Lewin .............. G06F 17/30902 709/213 |
| 2014/0052825 A1* | 2/2014 | Luecke ................ H04L 67/327 709/219 |
| 2014/0362761 A1* | 12/2014 | Dankberg ............ H04L 67/325 370/312 |
| 2015/0180963 A1* | 6/2015 | Luecke .................. H04L 67/06 709/203 |
| 2015/0222681 A1* | 8/2015 | Basile .................... H04L 65/60 709/219 |
| 2015/0341285 A1* | 11/2015 | Aysola ................ H04L 63/0428 370/392 |

OTHER PUBLICATIONS

Amazon Web Services, "Amazon Silk Developer Guide", May 8, 2013, pp. 1-50.
The Chromium Projects, "SPDY: An Experimental Protocol for a Faster Web", downloaded Jan. 14, 2014, pp. 1-5.

* cited by examiner

ENHANCED BROWSING USING CDN ROUTING CAPABILITIES

BACKGROUND

Many websites today implement media-rich web pages, for which additional resources such as embedded images and videos sometimes have to be obtained from a variety of content servers for eventual display at a client browser. Once a client computing device (such as a laptop, smartphone, tablet or desktop system) obtains the web page and the associated additional resources, the content may be processed in a number of stages by a software browser application or other client computing device interface. For example, the software browser application may parse the web page to process various elements of HTML (HyperText Markup Language) layout information and references to associated resources, identify and process Cascading Style Sheets ("CSS") information, process and instantiate various elements of JavaScript code associated with the page, and/or calculate various layout and display properties of the processed content for presentation to a user.

From the perspective of a user of the client computing device, the overall browsing user experience may depend on various factors including the latencies associated with obtaining network content over a communication network, processing embedded resource identifiers, generating requests to obtain embedded resources, and rendering content on the client computing device. At least some of the latencies involved may be dependent on the network routes that are chosen for obtaining the requested web page and associated resources. While route selection decisions are typically opaque to the end-user, the selection of suboptimal routes may result in significantly lowered customer satisfaction with respect to browsing, which may in turn have negative impacts on the business entities whose web sites are being accessed. The impact of poor latency resulting in part from poor routing decisions may be especially apparent on client computing devices with limited network bandwidth, processing power, or memory such as tablets, smartphones, and the like.

Figure 1:
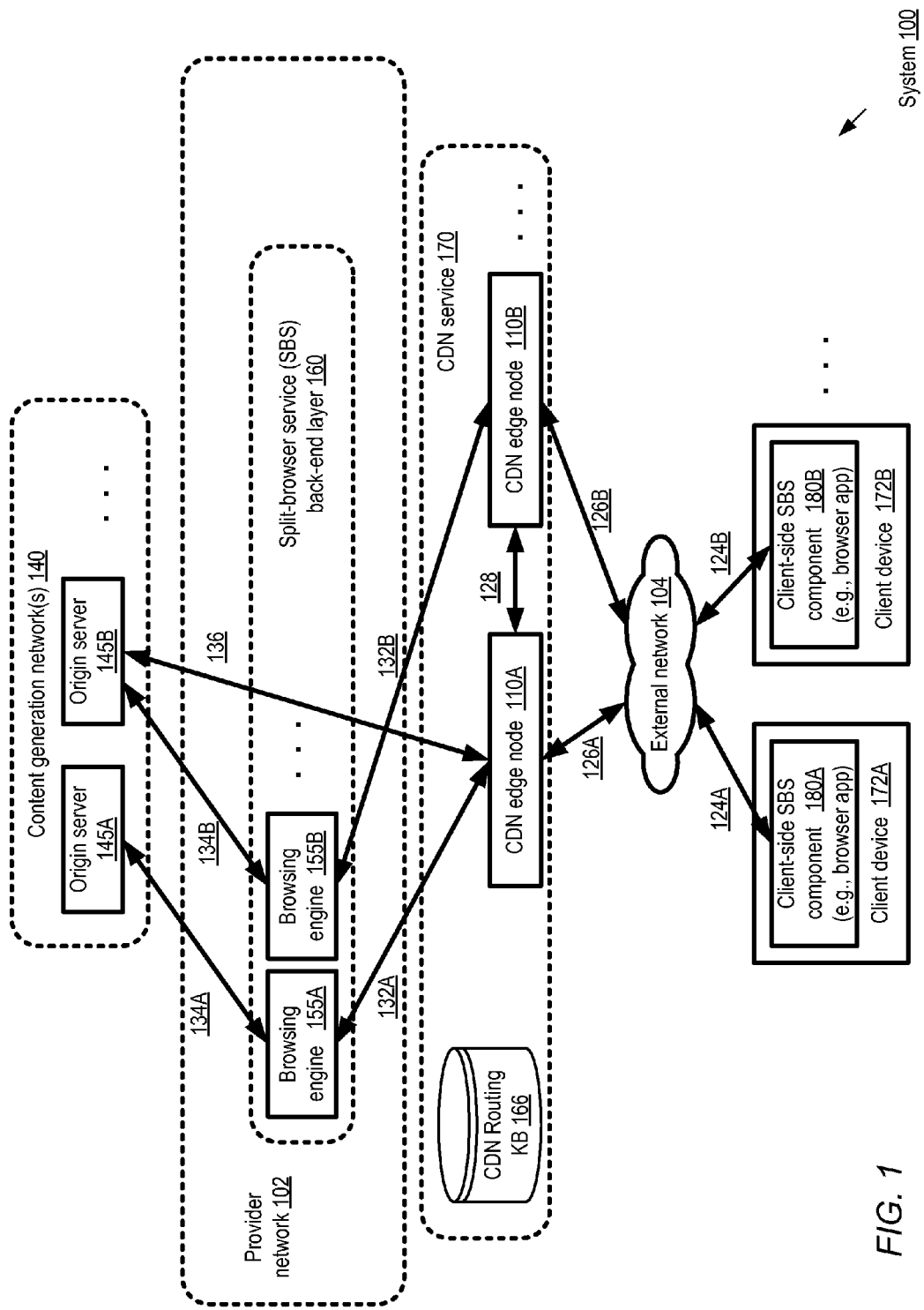
FIG. 1 illustrates an example system environment in which a routing-related knowledge base of a content delivery service (CDN) may be used to select network paths for handling encapsulated client requests associated with a split-browser service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for utilizing content delivery network (CDN) routing capabilities to enhance end-user web browsing performance are described. In at least some embodiments, such performance improvement techniques may be applied in the context of a split-browser service (SBS) of a provider network, in which the work of retrieving, processing and/or generating the display of the content required for a web page may often be distributed among separate client-side and server-side browsing components. For example, an end user may submit a web browsing request from a client-side browser component of the SBS at a device such as a tablet or smartphone. In some existing SBS implementations, an encapsulated representation of at least a portion of the end user's request may typically be transmitted to one or more back-end or server-side resources of the SBS, such as computationally powerful browsing engines implemented using provider network resources. Encapsulation may be used, for example, so that sensitive information that may be included in the web request (or just the identity of the target content generators/ providers, which may not necessarily be sensitive) remains hidden from intermediary devices. Depending on the nature of the request and/or on SBS configuration settings for the client device or the client session, the back-end browsing engines may in some cases extract the web request from the encapsulated representation and perform one or more content retrieval analysis steps, e.g., to determine whether the requested web page includes identifiers (e.g., uniform resource locators or universal resource identifiers) of embedded resources such as videos, images and the like. The server-side browsing engines may then perform at least some of the retrieval and processing steps required to deliver the requested content to the end user's device: e.g., identifying the sources from which the content components of the web page are to be obtained, retrieving various elements of the content components, executing scripting code of the web page if required, transmitting the retrieved content components in the appropriate format and layout to the client's browser, and so on. For some highly sensitive web requests, such as requests for financial transactions, the server-side browsing engines may simply transmit the requests on to the content sources without examining the request contents. In at least one embodiment, some of the original browsing requests may use secure protocols such as SSL (secure sockets layer) or TLS (transport layer security), in which case the server-side browsing engines may only be able to forward such requests on to their targeted web sites. By offloading some of the work onto more powerful back-end servers, a split-browsing service may be able to significantly shorten the web page response time as perceived by the end user, especially in scenarios in which the client device is relatively underpowered with respect to processing capabilities, bandwidth or memory.

In some embodiments, a set of browsing engines of the SBS may be established at selected data centers of the provider network. The SBS browsing engines may also be referred to herein as SBS server-side nodes or SBS back-end nodes. The locations of the client devices from which the browsing requests originate may change over time—e.g., a user may use their tablet, smartphone or laptop from various different locations during the course of a day or a week, and some of the locations may offer somewhat limited bandwidth to the Internet. Consequently, the network routes over which the encapsulated end-user requests reach the browsing engines may vary as well, and may be selected by some collection of Internet routers (or routers owned/managed by the end user's business organization or intermediary network providers) using a route selection methodology into which the end users may have limited or no visibility. Some of the decisions made for route selection may involve the use of fairly complex routing protocols such as BGP (Border Gateway Protocol), potentially involving several peer-to-peer interactions between BGP endpoints at autonomous networks (AN) owned by different business entities. The logic used for route selection may be intended to achieve goals that do not always align with the end-user's goal of viewing the requested web page content as quickly as possible. For example, a router owned by a business entity A may select a next hop to an intermediary network IN1 based on a business relationship between the owner of the network IN1 and business entity A, not necessarily because the next hop would result in the fastest transmission of the browsing request or response. Even when routes are selected with the best of intentions, the decentralized nature of the routing algorithms may often result in sub-optimal routes being selected, for example because it may take a while for useful routing updates to spread across the Internet, and/or because congestion levels at different parts of the Internet may change relatively quickly. As a result of possible sub-optimal routing between the client devices and the browsing engines, some of the advantages of using the more powerful back-end browsing engines could be lost.

Accordingly, in some embodiments the provider network operator responsible for the split-browser service may utilize the routing expertise of some intermediary such as a content delivery network or content distribution network (CDN) to reduce web browsing request and/or response latencies. Generally speaking, a CDN may comprise a geographically distributed collection of nodes or "edge servers" (managed with the help of some set of administrative or control-plane devices) with a primary goal of caching web content at locations that are physically closer to the end-user consumers of the content. For example, a large CDN service may comprise hundreds or thousands of edge servers distributed among dozens or hundreds of so-called "points-of-presence" (POPs) across several countries or continents. Each edge server (or the POP at which the edge server is located) may comprise storage devices capable of caching large content bases, including for example web page subcomponents (page text, graphics and scripts), downloadable embedded objects (video or sound files), applications, streaming media, and social networking site content. In some embodiments, the provider network that implements the split-browser service and/or other services may offer its own CDN service, or may enter into a business partnership with another entity that offers a CDN service. CDN operators may in general help content generators (e.g., the business or individuals whose web content is generated at various "origin" servers and is to be cached at the CDN edge nodes) by enhancing the speed with which their content can be downloaded and viewed, and also by providing some level of protection from denial-of-service attacks and network intruders in general. To cache requested content, the CDN edge nodes first have to obtain the content from the content generators. In order to do so efficiently, at least some CDNs may gather various types of performance and/or reliability metrics for various parts of the Internet, in addition to collecting route advertisements and the like. For example, some CDN nodes may periodically send test packets along various pathways from a set of CDN endpoints to a given content source such as a web site X (or a test target T with a similar network location as web site X), and record the time it took for the packets to reach X or T and/or return to the test origin. These metrics may then be used to select the particular CDN edge node to be used for a particular type of CDN client request, and/or the best routes to be used to retrieve the requested content for a particular type of CDN client request for caching purposes. The set of data and metadata collected by a CDN to help it select routes to achieve better performance for data retrievals and/or request transmissions may be referred to herein as a routing knowledge base. In some embodiments, the CDN may use machine learning or other techniques to improve its routing decisions (e.g., by detecting congested parts of the Internet more quickly) over time, and the results of such techniques may be incorporated into a set of heuristics or rules of the knowledge base.

In at least some embodiments, the routing expertise that a CDN builds up primarily for its own caching-related purposes may also be used to select routes for browsing requests from SBS clients, and for the responses to such requests. For example, consider a scenario in which a browsing request BR1 from a client-side component (such as an SBS browser at a smartphone S1) at a geographical location G1 is to be transmitted to the SBS back-end browsing engine BE1 at a provider network data center DC1. In embodiments in which the provider network comprises a plurality of browser engines, any of several techniques may be used to select the particular browsing engine BE1 as the target of BR1—for example, each client-side component of the SBS may have a corresponding browser engine designated for it as part of dynamically modifiable client-side browser configuration settings, or BE1 may be selected once during installation/startup of the client-side browser in different embodiments.

A CDN edge node EN1 may be used to help respond to BR1 in one of at least two modes in various embodiments.

The two modes may be referred to herein as "route-selection-only" (RSO) mode and "content retrieval analysis" (CRA) mode herein. As a preliminary step in both the RSO and CRA modes, configuration settings at the client-side browser component and/or some set of DNS (Domain Name Service) servers may be modified so that an encapsulated representation of the client's browsing requests is sent to an appropriate CDN edge node, instead of being directed to BE1 without using the CDN. In some implementations, a CDN service may include its own set of DNS servers and/or other name servers. In the RSO mode, the CDN node EN1 may be able to determine that BR1 is to be transmitted to a server-side browsing engine such as BE1, but may not be permitted to (and/or may not be able to, depending on the nature of the technique used for encapsulation) examine further details of BR1. The fact that the request is targeted to an SBS back-end engine may, for example, be indicated in a field of the encapsulated representation that EN1 can parse. In some implementations, the identity of the specific back-end SBS node BE1 may be indicated in the encapsulated representation, while in other implementations just the fact that the request is to be sent to some back-end SBS node may be indicated, and EN1 may select an appropriate back-end browsing engine. Using the routing knowledge base of the CDN, EN1 may select at least a portion of the route (e.g., one or more hops) to be used to transmit the request BR1 to a back-end SBS node such as BE1, and may transmit the request along the first hop of that route.

In at least some embodiments, the route selected may comprise network links that are owned/managed by the provider network operator or business partners of the provider network operator, and hence may be capable of providing higher transmission rates and bandwidths than may be possible on average at links of the public Internet that may otherwise have been selected. Thus, using the CDN in RSO mode for a split-browser request may result in speedup in two ways. First, a CDN edge node that is located relatively close to the client browsing device S1 may be used as the entry point into a more predictable and performant set of networks than might otherwise have been used to reach the SBS back-end. Second, the routing expertise of the CDN may be used to find an optimal path between the CDN edge node and a selected SBS back-end browsing engine. It is noted that at least in some embodiments, in the RSO mode, the caching capabilities of the CDN may not be used to respond to browser requests, since the CDN edge node may not be permitted to examine the un-encapsulated browsing request to determine the exact content being requested. In RSO mode, after the SBS browsing engine receives the client request, similar kinds of operations may be performed at the browsing engine as would have been performed if the CDN were not involved in route selection. E.g., the browsing engine BE1 may extract the browsing request from its encapsulated representation, determine which parts (if any) of the content retrieval or processing are to be performed by the browsing engine, and initiate the appropriate retrieval and processing steps. In at least some embodiments, the retrieved and/or formatted content prepared by the browser engine in response to the client request may be sent back to S1 via at least some of the network links that were used for the request itself—e.g., links of the optimized route selected by the CDN edge node may be used in the reverse direction for the response.

In the content retrieval analysis (CRA) mode of operation, the CDN edge node EN1 may be permitted to perform at least an initial stage of content retrieval analysis by examining the un-encapsulated or extracted contents of BR1. For example, upon examining the extracted request, EN1 may be able to determine whether some or all of the content requested can be fulfilled from ENT's cache, or whether some other edge node EN2 of the CDN may be able to provide some of the requested content. In some cases, EN1 may transmit requests for at least some of the embedded objects of the requested web page to the appropriate content sources, and provide the responses to the client browsing device. In at least one embodiment, the CDN edge node may be able to parallelize content retrieval for a given browsing request—e.g., by submitting requests for several content components to respective content sources in parallel over selected optimized routes. In some scenarios, it may be the case that EN1 is not able to determine all the sources from which requested content is to be generated, or is not capable of fulfilling the request in its entirety for other reasons, and may therefore decide to transmit at least a portion of the request (either in encapsulated or un-encapsulated form) to an SBS back-end node. In one example scenario, despite its examination of the browsing request BR1, the edge node EN1 may not be able to retrieve and/or process any of the request content, in which case BR1 may simply end up performing the same operations it would have done in RSO mode—namely, identifying a good route to transmit BR1 to an SBS back-end node, and transmitting BR1 accordingly along a hop of that route. If the original browsing request was for data encrypted via SSL/TLS, in some embodiments only the RSO mode may be supported.

In at least some embodiments, the end-users of the SBS may be able to decide whether the RSO mode or the CRA mode is to be used for their browsing requests (or for some subsets of their requests). For example, as described below in further detail, an end-user-selectable browser configuration setting may be implemented in some embodiments to allow end-users to opt in for either the RSO mode, the CRA mode, or both modes, for various web sites or destinations. In some embodiments, the CDN edge node may be informed explicitly (e.g., in a header of a packet comprising the encapsulated browsing request) which mode of operation is to be used. In other embodiments, an edge node may be able determine implicitly that the RSO mode is to be used and no content retrieval analysis is to be performed at the CDN, e.g., because the edge node may not be provided all the necessary cryptographic keys or credentials to extract the browsing request from its encapsulated representation. In one embodiment, configuration settings at the CDN edge nodes may determine whether RSO or CRA mode is to be used—e.g., the SBS back-end may transmit directives to the CDN edge nodes indicating the mode that is to be used for specified clients or specified categories of requests.

Example System Environment

FIG. 1 illustrates an example system environment in which a routing-related knowledge base of a content delivery network (CDN) service may be used to select network paths for handling encapsulated client requests associated with a split-browser service, according to at least some embodiments. As shown, system 100 comprises a provider network 102 at which a number of services may be implemented, including at least a back-end layer of a split-browser service (SBS). In some embodiments, at least a portion of a content delivery network (CDN) service 170 may also be implemented using resources owned by the provider network operator. Networks set up by an entity such as a company or a public sector organization to provide one or more network-accessible services (such as various types of cloud-based database, computing or storage services) accessible via the Internet and/or other networks to a distributed set of clients may be termed provider networks herein. Some of the services may be used to build higher-level services: for example, computing, or storage services may be used as building blocks for high-end parallel computing services, data streaming services, a back-end layer 160 of the SBS, and the like.

Client-side components 180 (e.g., browser applications 180A or 180B) of the split-browser service may run on respective client devices 172 (e.g., 172A or 172B) such as tablets, smartphones, wearable computing devices, laptops, desktops and the like in the depicted embodiment. A number of back-end servers of the split-browser service, such as browsing engines 155A and 155B, may be set up at the provider network 102 to offload at least a portion of the web page content retrieval operations and related processing tasks from the client-side components. Generally speaking, the browsing engines 155 (which may be implemented for example using compute instances of a virtual computing service of the provider network 102) may have greater computational capacity, storage capacity, and/or network bandwidth capacity than is available at a typical client devices 172, and thus may be able to obtain and assemble at least some components of complex web pages more quickly than the client devices. In at least some embodiments, an encryption-based encapsulation protocol may be used for transmitting the browsing requests generated at the client-side components 180 over the external network 104, and the browsing engines 155 may comprise the necessary cryptographic modules and credentials to extract the original browsing requests from their encapsulated representations, determine the set of operations that may be required to generate the responses to the browsing requests, and perform at least some subset of those operations. In other embodiments, an encapsulation protocol that does not require encryption may be used. In at least one embodiment, the back-end layer 160 of the SBS may store configuration settings for various client-side components 180 that can be used to identify the particular types of content retrieval and processing related operations that are to be performed at the browsing engines 155, as opposed to the types of operations that are to be performed at the client-side components. A content generator may designate one or more origin servers 145 as the authoritative sources from which a particular set of web content (e.g., web page contents of a newspaper web site or an e-commerce web site) is to be obtained. The set of tasks performed by the browsing engines 155 for a given browsing request may, for example, include identifying a set of content elements that have to be retrieved from respective origin servers 145 (e.g., origin servers 145A and 145B) at one or more content generation networks 140, retrieving the content elements, post-processing the elements for layout/display purposes, and so on. After a selected set of tasks for a particular browsing request from a client-side component has been performed at a browsing engine, the results of that set of tasks may typically be transmitted back to the client device 172 from which the request originated. At the client device, the content sent transmitted from the browsing engine may be combined with results of the subset of content retrieval or processing tasks (if any) that are performed by the client-side component for display to an end user. Examples of the kinds of tasks that may be required to generate a response to a browsing request, and of various ways in which those tasks may be split between the server-side browsing engines 155 and the client-side components 180 in various embodiments are described below with reference to FIG. 2.

In the depicted embodiment, the CDN service 170 may collaborate with, or be used by, the SBS to further optimize the browsing experience of the end users (e.g., by reducing the latency of web page generation). As mentioned earlier, in some embodiments, the CDN service may be implemented using provider network resources, or may be owned/managed by the provider network operator. In at least some cases, the network pathways between the CDN service's edge nodes 110 and the back-end layer of the SBS may comprise links that are managed/owned by the provider network operator, and thus may provide higher levels of performance and reliability than at least some links of the public Internet. In some embodiments, the appropriate configuration changes may be made at various Internet routers, DNS servers of external network 104, and/or at the client-side SBS components 180 such that the encapsulated browsing requests generated at the client-side components are directed to a nearby CDN edge node 110 (e.g., 110A or 110B) first, as indicated by the arrows labeled 124A, 124B, 126A and 126B.

A particular CDN edge node 110 may assist the SBS in at least one of two modes of operation in the depicted embodiment. In one mode, referred to above as the route-selection-only (RSO) mode, the CDN edge node 110 that receives an encapsulated browsing request determines that it is not to perform any content retrieval analysis on the request, but is simply to use the CDNs routing knowledge base 166 to select a route over which the request should be sent to the appropriate server-side browsing engine 155. In some embodiments, the CDN edge node may be able to identify the particular browsing engine 155 to which a particular browsing request should be directed, e.g., by examining a header of the encapsulated representation of the browsing request, by looking up the client device in an SBS database to which the CDN has access, by mapping the network address or some other identification information of the client device 172 to the particular browsing engine, or using some other technique. In other embodiments, the CDN edge node 110 may have more flexibility in selecting the particular browsing engine 155—e.g., the browsing engine may be selected based on the CDN's knowledge of recent traffic trends within various portions of the provider network. In the example illustrated in FIG. 1, when operating in RSO mode, CDN edge node 110A may transmit a browsing request received via paths 124A and 126A from client device 172A to browsing engine 155A, as indicated by arrow 132A. The browsing engine 155A may perform the kind of content retrieval and processing operations described above, such as, for example, retrieving a text component or an embedded image from an origin server 145A (as indicated by arrow 134A). If CDN edge node 110B is operating in RSO mode at least with respect to a particular browsing request from client device 172B received via paths 124B and 126B, the request may be forwarded along a route 132B selected using the knowledge base 166 to browsing engine 155B. Browsing engine 155B may, among other tasks, retrieve content for the request from origin server 145B along path 134B. Similar network paths (in the reverse direction) may be used to return the retrieved content to the client device 172A.

Thus, in RSO mode, the CDN edge nodes may utilize the CDN routing knowledge base 166 primarily to try to reduce the time it takes for the client's browsing request to reach the back-end layer of the SBS, and leave the work of content retrieval and processing largely to the SBS back-end layer. The routing knowledge base 166 may have been intended primarily for the CDN's core responsibilities, e.g., to help populate the CDN edge node caches efficiently, but may be used in the depicted embodiment to improve the end-user performance of the SBS without necessarily using the CDN caches. The knowledge base may include, among other data, various routing change records (e.g., RIB (routing information base) entries) that the CDN has collected, metrics of end-to-end latencies collected from various CDN edge nodes and/or CDN test devices for various Internet and provider network endpoints, routing heuristics that have been developed using machine learning or other techniques, and so on. CDN service edge nodes may typically be distributed widely around the world, while the SBS back-end nodes may be concentrated in a few data centers in at least some embodiments. The CDN edge node selected for a given browsing request may be relatively close (at least in terms of network hops) to the client device, and as a result the browsing request may enter a higher-performant network than at least some portions of the public Internet more quickly than if the browsing request was directed to an SBS back-end node without passing through the CDN service. In addition, paths (such as 132A and 132B) to the SBS back-end layer 160 chosen using the routing knowledge base 166 of the CDN may in at least some cases be much shorter than the paths that may have been taken on the basis of routes selected by routers of external network 104 alone.

In a different mode, referred to earlier as the content retrieval analysis (CRA) mode, the CDN edge nodes may take on a greater proportion of the work involved in generating the content to be returned to the client devices 172, at least for some browsing requests. In the CRA mode, a CDN edge node 100 may extract the contents of an encapsulated browsing request received from a client and perform at least an initial phase of content retrieval analysis. In such an initial phase, the CDN edge node may identify the various content components (e.g., text blocks, images, videos and the like) required to satisfy the browsing request, and determine whether the CDN edge node's own cache (or that of some other CDN edge node) may contain some of the requested components. In addition, for those components that are not in the CDN's caches, the edge node may determine whether the edge node itself should request the content from the appropriate origin server 145, or whether the remainder of the browsing work should be handed to an SBS back-end browsing engine 145. As indicated by arrow 136, in CRA mode, a given edge node 110A may request content components directly from origin servers such as 145A, and provide the retrieved content to the client device. In at least some cases, the CDN edge node 110A may be able to determine that a different edge node 110B is a better candidate for handling the browsing request, e.g., either because node 110B may have more of the requested content in its cache or because node 110B may have a better path to the origin nodes from which the requested content can be retrieved. In some embodiments, therefore, as indicated by arrows 128, a browsing request received at one CDN edge node 110A may be transmitted to another CDN edge node, e.g., either in encapsulated form or in extracted form. In at least one embodiment, a CDN edge node may open respective connections to a plurality of other content sources on behalf of a given browsing request, e.g., using a respective optimized route in each case, and retrieve content elements in parallel from the other content sources.

In at least one embodiment, a given CDN edge server may implement the RSO mode of operation for some set of browsing requests, and the CRA mode of operation for some other set of browsing requests. In some cases, both modes may be implemented concurrently for respective sets of requests at a given CDN edge node. In one embodiment, the decision as to which mode of operation is to be used at a given CDN edge node for a given set of client browsing requests may be made by a control-plane or administrative component of the SBS—e.g., the SBS may inform the CDN service that requests from specified client device types or network address ranges are to be handled in RSO mode (or in CRA mode). In another embodiment, end users may be allowed to opt in for the RSO and/or CRA modes, e.g., at least for specified targeted web domains. Configuration settings at the CDN edge nodes may be modified to reflect the modes to be used for various received browsing requests in various embodiments, e.g., based on end-user preferences, SBS control-plane directives, and so on. In some embodiments, an implicit indication of whether the RSO mode is to be used or the CRA mode is to be used may be provided to the CDN edge nodes based on the cryptographic keys/credentials provided to the CDN edge node. For example, if a CDN edge node 110 receives an encapsulated browsing request BR1 from which it cannot extract the original request due to a lack of the requisite cryptographic keys/credentials, it may determine that the RSO mode is appropriate for BR1. In contrast, if the CDN edge node 110 receives a different browsing request BR2 for which the SBS has provided the credentials/keys needed for extraction (either from the server-side SBS components or from the client-side SBS components), the CDN edge node may elect to use the CRA mode. In at least some embodiments, multiple levels of encryption may be used: for example, at least a portion of a browsing request BR1 (e.g., some set of URIs from which content is to be retrieved securely to form part of the response to the request) may be encrypted using a first set of keys/credentials, and then the entire browsing request may be encrypted using a second set of keys of the encapsulation protocol. In such a multi-level encryption scenario, it may be the case that the CDN edge node 110 has the second set of keys, but not the first set of keys. Thus, the CDN edge node may be able to extract an un-encapsulated intermediate version from the encapsulated request, but the CDN edge node may still not be able to identify or retrieve all the content elements needed for the page. In some such embodiments in which multiple levels of encryption are used, therefore, the CDN edge node may have to rely on the back-end engines of the SBS for content analysis/retrieval for a given browsing request even if the request is partially decrypted at the CDN edge node.

In at least one embodiment when operating in CRA mode, an initial set of content sources (e.g., origin servers, other CDN edge nodes, and the like) that are to be employed to generate the response to a browsing request may be selected by the CDN edge node, and content retrieval operations may be begun accordingly. However, before the entire set of content requested from a given content source has been acquired, the edge node may decide that a different content source may be a better candidate (e.g., the probability of better performance being achieved using the different content source is above some threshold). Consider an example scenario in which a content component CC1 (such as a video file or other large file) is to be retrieved for the client, and content source CS1 is initially selected for CC1. Depending for example on the performance criteria to be met for the browsing request and/or on the responsiveness of CS1, the edge server 110 may decide to abandon content retrieval from CS1 mid-stream (e.g., before all of the requested content has been retrieved). Instead, a connection to a different content source CS2 (e.g., a mirror site of CS1 that also has the requested content component CC1) may be established, and the content may be retrieved from CS2 instead. Such dynamic changes to content sources may be made, for example, based on newly-obtained routing metrics or test results of the CDN knowledge base 166 in some embodiments. In some embodiments, the SBS back-end layer may inform the CDN edge nodes regarding the thresholds, rules or heuristics to be used for changing content sources—e.g., a CDN edge node may be directed to initiate such a change only if the estimated probability of improving the latency for a content component by 50% or more is above 80%.

Example Content Processing Actions

Figure 2:
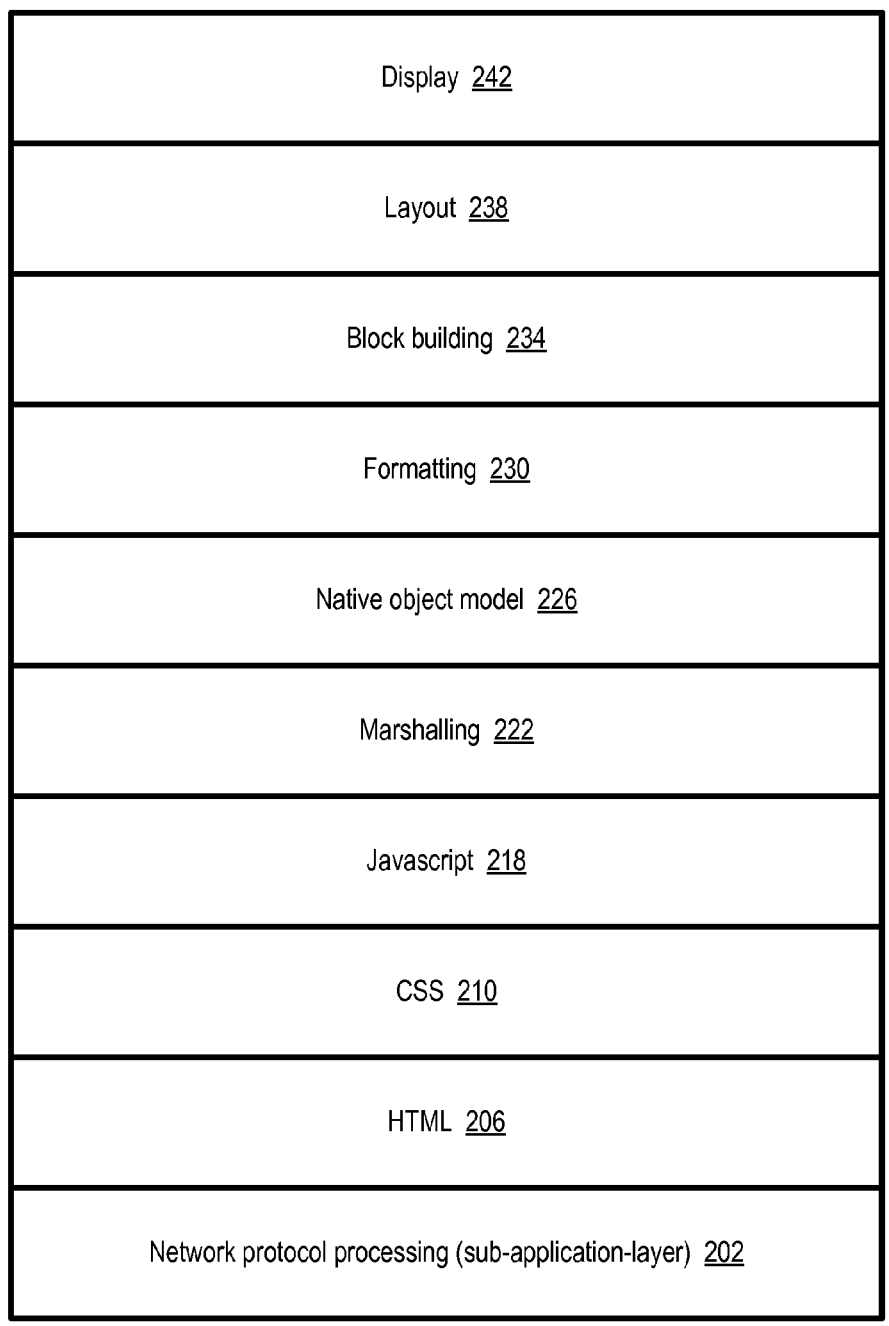
FIG. 2 illustrates examples of content processing actions that may be performed by a series of processing subsystems to respond to a browsing request, according to at least some embodiments.

As described earlier, in some embodiments a split-browsing service may potentially perform a subset of the operations needed to respond to a client browsing request at back-end layer browsing engines, and a different subset of the operations at the client-side components. In embodiments in which CDN edge nodes operate in CRA mode, some of the operations may be performed at the CDN layer. FIG. 2 illustrates examples of content processing actions that may be performed by a series of processing subsystems to respond to a browsing request, according to at least some embodiments. In some embodiments and for some types of browsing requests, for example, all of the illustrated processing actions may be performed at a browsing engine 155 or at a CDN edge node based on SBS configuration settings applicable to a client, and the results may be sent to the client-side component for display. In other embodiments and/or for other types of browsing requests, only a small subset of the processing tasks illustrated may be performed at the back-end layer of the SBS and/or at the CDN edge nodes. It is noted that the subsystems shown in FIG. 2 are depicted for the purpose of illustration, and are not intended to describe a necessary order or a definitive list of browser processing subsystems. Various SBS components may implement additional or fewer subsystems than shown in FIG. 2, and may order the subsystems or corresponding processing actions in any number of different ways.

A networking protocol processing subsystem 202 may be responsible for communication processing (below the application layer) between the browser and the appropriate content sources. As network resources such as HTML documents are downloaded from the server they may be passed to an HTML subsystem 206 which parses the document, initiates additional downloads in the networking subsystem 202, and creates a structural representation of the document. Modern browsers may also contain related subsystems which are used for XHTML (Extensible HTML), XML (Extensible Markup Language) and SVG (Scalable Vector Graphics) documents. When and if CSS code is encountered, whether inside an HTML document or in an embedded CSS document, it may be passed to a CSS subsystem 210 to parse the style information and create a structural representation that can be referenced later.

A JavaScript subsystem 218 may be responsible for executing JavaScript code of the web page. In some implementations, JavaScript engines are not directly integrated into the browser, and a communication layer including a marshalling subsystem 222 may serve as an intermediary between the browser and the script engine. Passing information through this communication layer may generally be referred to as marshaling. In some embodiments, JavaScript interacts with an underlying network resource such as a web document through Document Object Model APIs. These APIs may be provided through a native object model subsystem 226 that knows how to access and manipulate the document and is the primary interaction point between the script engine and the browser. Once the document is constructed, style information may be applied before it is displayed to the end user. A formatting subsystem 230 may take the HTML document and apply the appropriate styles. In some embodiments, a block based layout system may be used for the web page to be displayed. After the document is styled, the next step, at a block building subsystem 234, may be to construct rectangular blocks that will be displayed to the user. This process may determine things like the size of the blocks and may be tightly integrated with the next stage, layout.

A layout subsystem 238 may be responsible for laying out the content of the web page after the blocks are constructed. Various configuration settings associated with the client computing device or browser (e.g., as provided in the initial browsing request) may be used in order to generate a suitable layout for the client computing device. For example, a mobile device may provide a screen resolution and a display mode. Either the client-side component or the back-end component of the SBS may base layout calculations on this screen resolution and display mode in order to generate a processing result corresponding to a content representation suitable for a browser running on the mobile device. The final stage of the process may occur inside the display subsystem 242 where the final content is displayed to the user. This process is often referred to as drawing.

The boundary between the responsibilities of the back-end SBS layer, the CDN edge nodes and the client-side components may be drawn between various pairs of the subsystems illustrated in various embodiments. In one embodiment, for example, for a particular request, a CDN edge node may retrieve the web page HTML via its network processing subsystem (or from its cache) and provide the HTML to the back-end SBS browsing engine for further processing. For a different request, the HTML may be parsed at the CDN edge node, but remaining layers of processing may be performed at the browsing engines.

Interactions Between SBS Components and CDN Edge Nodes

Figure 3:
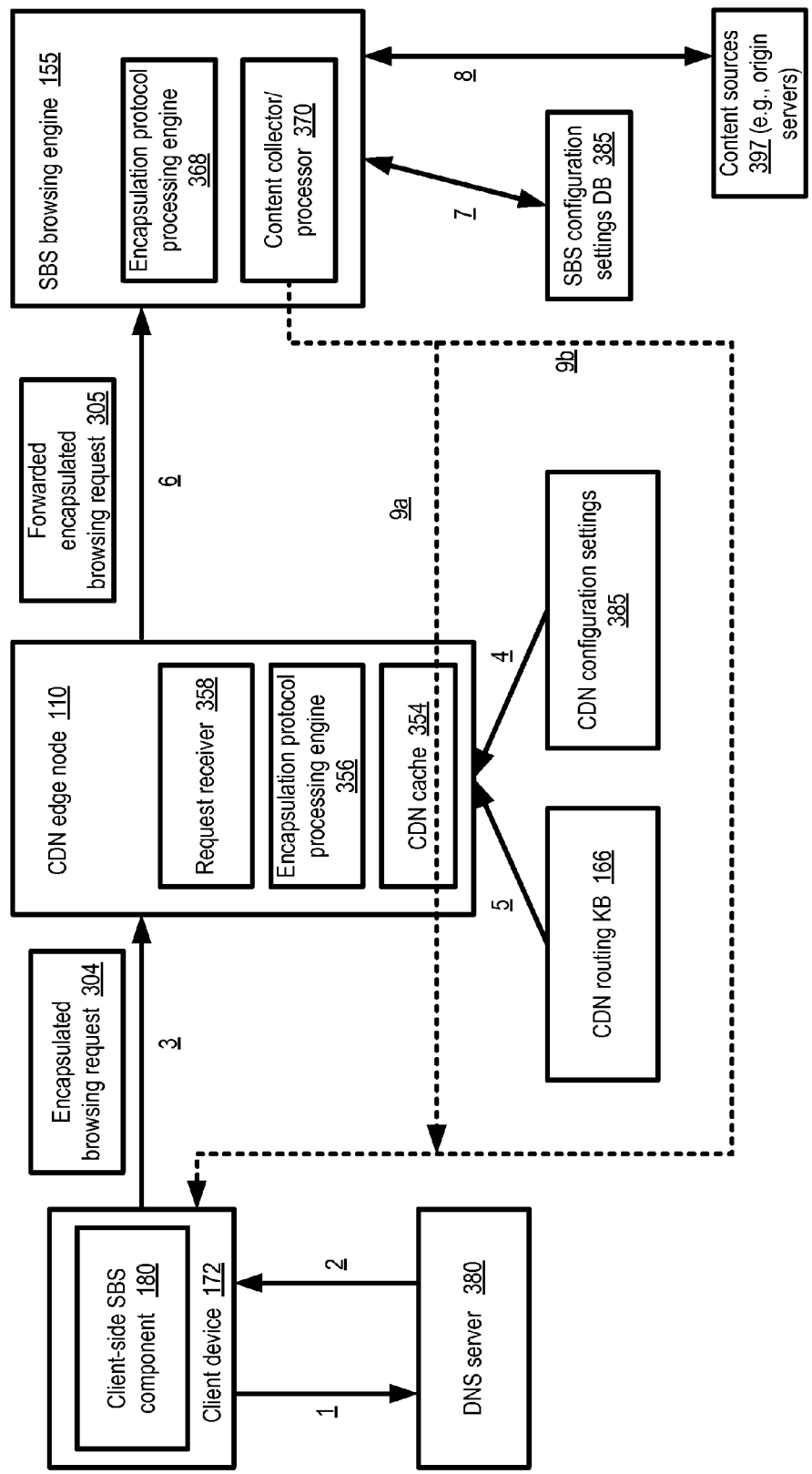
FIG. 3 illustrates examples of interactions between client devices, CDN edge nodes and back-end browsing engines of a split-browser service involved in responding to browsing requests, according to at least some embodiments.

FIG. 3 illustrates examples of interactions between client devices, CDN edge nodes and back-end browsing engines of a split-browser service involved in responding to browsing requests, according to at least some embodiments. As indicated by the arrow labeled "1", if a client-side component 180 of the SBS (such as a browser application program) at a client device 172 does not already have an address of a CDN edge node to which it should transmit its browsing requests, the client-side component may obtain an address of a CDN edge node 100 from a DNS (Domain Name System) server 380 in the depicted embodiment. In some embodiments, the client-side SBS component may be hardwired to submit a particular CDN address to the DNS server 380, while in other embodiments the CDN address may be set using a configuration parameter of the client-side SBS component. The DNS server may provide an address of a nearby CDN edge node 110, as indicated by the arrow labeled "2". The result of a particular DNS lookup may typically be used for a plurality of browsing requests—e.g., the client device may not have to interact with the DNS server 380 for each browsing request.

When the end user of the client computing device 172 wishes to access a web page, they may enter a Universal Resource Locator (URL) or Uniform Resource Identifier (URI) of a web page into an address field of the client-side SBS component (or may click on a link to a URL or URI). The client-side component 180 may then encapsulate the end-user request and transmit the encapsulated representation 304 of the request to the CDN edge node 110, as indicated by the arrow labeled "3". At the CDN edge node 110, a request receiver component 358 may determine whether the browsing request is to be extracted at the CDN edge node for at least a first stage of content retrieval analysis, or is to be forwarded to a back-end SBS browsing engine 155 in its encapsulated form. The determination as to whether the request is to be handled in the RSO mode (i.e., forwarded without extraction and analysis) or CRA mode may be made based on a variety of factors in different embodiments. In one embodiment, a header field of the encapsulated browsing request that is readable (i.e., unencrypted) may indicate the mode to be used for the browsing request to the request receiver 358. In the embodiment shown in FIG. 3, as indicated by the arrow labeled "4", one or more entries of CDN configuration settings 385 may be read to determine the role that the edge node is to play. For example, some edge nodes may be configured to always use RSO mode, others to always use CRA mode, and some edge nodes may perform different actions for different client-side components 180 or different client devices 172. It is noted that in at least one implementation, client browsing requests may be encapsulated without encrypting them, e.g. by simply incorporating the client's request body and headers as the body of a message of the encapsulation protocol. Thus, in at least some implementations it may be possible to extract the original browsing request from the encapsulated representation without decryption.

If a determination is made that the CDN edge node is to operate in RSO mode, the encapsulation protocol processing engine 356 may not be used for the browsing request 304. Instead, the CDN edge node 110 may utilize a CDN routing knowledge base 166 (as indicated by arrow "5") to select at least a portion of a network route to a selected back-end browsing engine 155 of the SBS. In some embodiments, the particular browsing engine 155 may be indicated in the request 304, and the CDN edge node 100 may simply have to find the best route to it based on the entries available in the knowledge base 166. In other embodiments, the CDN edge node may have to select a back-end browsing engine based and then determine a good route to the selected browsing engine. The selection of the browsing engine 155 may be based on any of various factors in different embodiments such as network proximity to the CDN edge node 110, identification information of the client device 172 or client-side browsing component 180, preferences indicated in the headers of the encapsulated request 304, the CDN's knowledge of current traffic conditions in the networks that may have to be traversed to reach the SBS back-end nodes, etc. The CDN edge node may send the forwarded encapsulated request 305 on to the target back-end SBS browsing engine 155, as indicated by the arrow labeled "6".

At the browsing engine 155, the browsing request may be extracted or decrypted from the encapsulated representation by an encapsulation protocol processing engine 368. In at least some embodiments, an SBS configuration settings database 385 may be consulted (as indicated by arrow "7") to determine the set of content retrieval and processing operations that should be performed by the browsing engine 155 for the browsing request. In some cases, the browsing request itself may comprise an indication of configuration settings that are to be used for the client device for the current and/or future browsing requests, and such configuration settings may be stored in the database 385. In the depicted embodiment, as indicated by arrow "8", a content collector/processor component 370 of the browsing engine may retrieve one or more content components on behalf of the browsing request from one or more content sources 397, which may include origin servers, CDN edge nodes (including potentially the CDB edge node 110 from which the forwarded request was received) and the like. After the content components have been retrieved and the required processing actions (such as some subset of the actions shown in FIG. 2) have been completed, the results of the retrieval and/or processing may be provided to the client device 172. As indicated by the arrow labeled 9b, in at least some cases the results may be provided to the client device using a path that does not include the CDN edge node 110. As indicated by the arrow labeled 9b, in other cases, the CDN edge node may be used as an intermediary on the results path as well. Depending on the type of browsing response that is generated, at least a portion of the content being provided to the client device may be stored in the CDN edge node cache 354 in some implementations in which path 9b is used.

Figure 4:
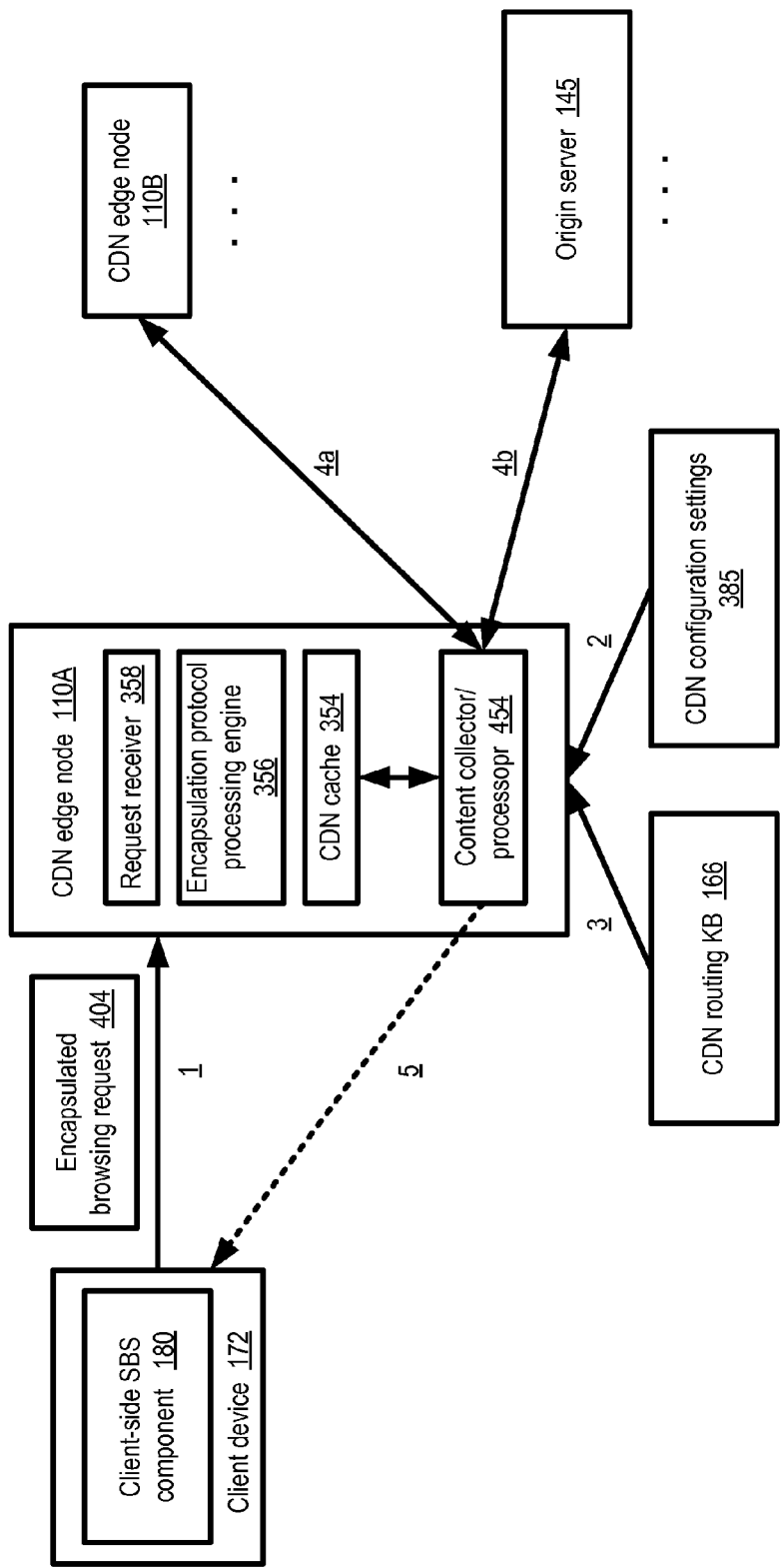
FIG. 4 illustrates examples of interactions between client devices, CDN edge nodes and content sources involved in responding to browsing requests for which the CDN edge nodes are permitted to perform content retrieval, according to at least some embodiments.

FIG. 4 illustrates examples of interactions between client devices, CDN edge nodes and content sources involved in responding to browsing requests for which the CDN edge nodes are permitted to perform content retrieval, according to at least some embodiments. Interactions between the client device 172 and DNS servers 380 are not shown, although a lookup similar to that shown in FIG. 3 may be required at least in some cases to determine the CDN edge node address to which the browsing request should be sent. In the depicted embodiment, after the encapsulated client request 404 reaches the request receiver (arrow "1") of a particular edge node 110A, CDN configuration settings 385 may be examined to determine whether the request should be handled in RSO mode or in CRA mode (arrow "2"). A determination may be made that the CRA mode is to be used for the request—i.e., that the browsing request should be extracted/decrypted from its encapsulated representation locally for at least an initial stage of content retrieval analysis. The encapsulation protocol processing engine 356 may extract the request. A content collector/processor 454 may examine the extracted request to determine the specific retrieval and/or processing steps that the CDN edge node should perform. In some cases, the content collector/processor may decide that at least some of content components are to be retrieved from other CDN edge nodes such as node 110B, or from origin servers 145. One or more requested content components may also be found in CDN edge node 110A's own cache 354 for some browsing requests. The CDN routing knowledge base 166 may be consulted (arrow "3") to determine the routes to be used to obtain the components from the other content sources (arrows "4a" and "4b"). Depending on the nature of the request, some of the retrieved content may be added to cache 354. A response may be provided to the client computing device, as indicated by arrow "5". In some cases, the CDN edge node 110 may determine that at least some of the content processing or retrieval operations for the request should be performed by a back-end SBS browsing engine (not shown in FIG. 4), and a message (e.g., indicating the entire browsing request or a portion of the request) may be sent to a selected browsing engine 155 accordingly. In some embodiments, the first CDN edge node that receives the request 404 may decide that the request would be more effectively handled by a different CDN edge node such as 110B, and the entire request may be transmitted to the other edge node 110B. In at least one embodiment, respective connections may be established from the first edge node 110A with each of a plurality of other content servers (e.g., other edge nodes and/or origin servers) to retrieve different subsets of the requested content in parallel.

Programmatic Interfaces for Route Optimization Preferences

Figure 5:
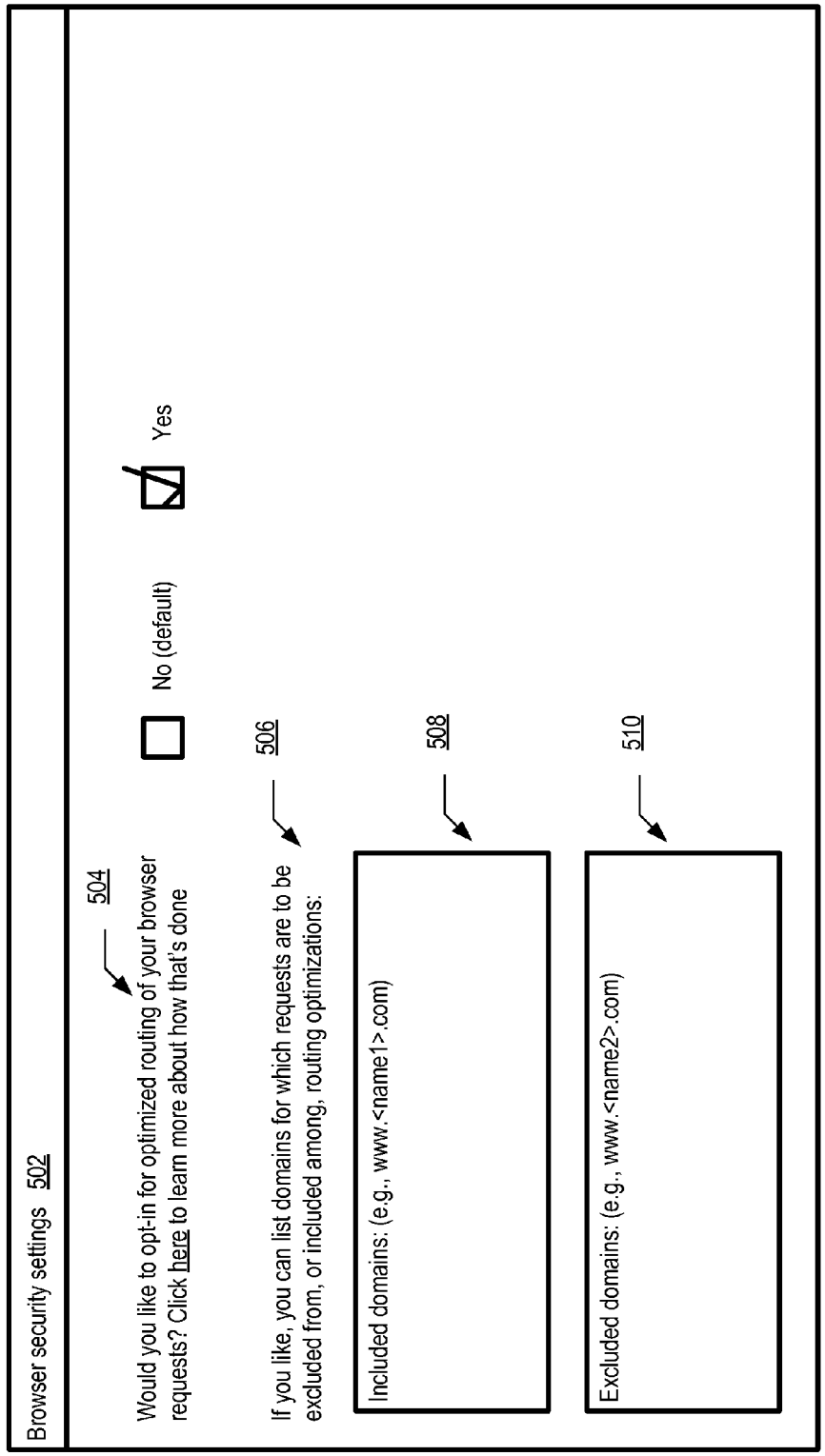
FIG. 5 illustrates an example programmatic interface that may be used to enable browser users to select routing optimization options for their web requests, according to at least some embodiments.

FIG. 5 illustrates an example programmatic interface that may be used to enable browser users to select routing optimization options for their web requests, according to at least some embodiments. The interface may be provided, for example, via a "settings" or "options" tab of a client-side component such as a browser application installed at a client device such as a tablet computer, smart phone, wearable computing device, laptop or desktop computer that leads to a browser security settings screen 502. In some embodiments a separate web page/site or console may be implemented to allow users to opt-in for the enhanced routing. A message 504 indicating the availability of optimized routing via CDN edge nodes may be displayed, and a link (as indicated by the "Click here" phrase) may be provided to enable end users to learn more about the details of the enhanced routing techniques that may be used.

As shown, in the depicted embodiment, by default the client's browsing requests may not be optimized (the "No" checkbox is shown as the default). If the user does wish to utilize routing optimization techniques of the kinds discussed above, the "Yes" check box may be checked. In other embodiments, the "Yes" option may be the default setting— e.g., routes for the user's browsing requests may be optimized using CDN knowledge bases by default. In addition, in some embodiments end users may be able to indicate specific web sites or domains for inclusion or exclusion from the optimized routing techniques. As directed by message 506, a user may specify included domains in text box 508, and/or included domains in text box 506. If a user indicates that optimized routing should be used for the user's browsing requests but does not indicate any included domains or excluded domains, in some implementations all the user's requests may be transmitted using routes determined with the help of the CDN's knowledge base. If a user indicates that optimized routing should be used and specifies one or more domains for inclusion (and none for exclusion), in some implementations only requests directed to the specified domains may be optimized. Similarly, if a user indicates that optimized routing should be used and specifies one or more domains to be excluded (and none to be explicitly included), all the user's requests except those to the excluded domains may be transmitted using optimized routing. If the user attempts to specify both excluded and included domains, in some implementations an error message may be displayed indicating that only one of the two types of preferences can be selected.

In the depicted embodiment, the "optimized routing" being referred to on the settings screen may involve the CDN edge nodes operating in either the RSO mode or the CRA mode at the discretion of the SBS and/or the CDN service. Thus, by indicating that optimized routing should be used, the user may be permitting the extraction and analysis of at least some browsing requests at CDN edge nodes. In other embodiments, the user may be given the option of indicating separately whether CRA mode or RSO mode should be used for the user's requests. Depending on the selections made by the user, in some implementations a set of cryptographic keys and/or credentials may be provided to one or more CDN edge nodes (e.g., either by the client-side component or by the back-end layer of the SBS) to enable the edge node(s) to extract browsing requests from their encapsulated representations. Other programmatic interfaces such as APIs (application programming interfaces) or command-line tools may be implemented in other embodiments.

Example Client Devices

Figure 6:
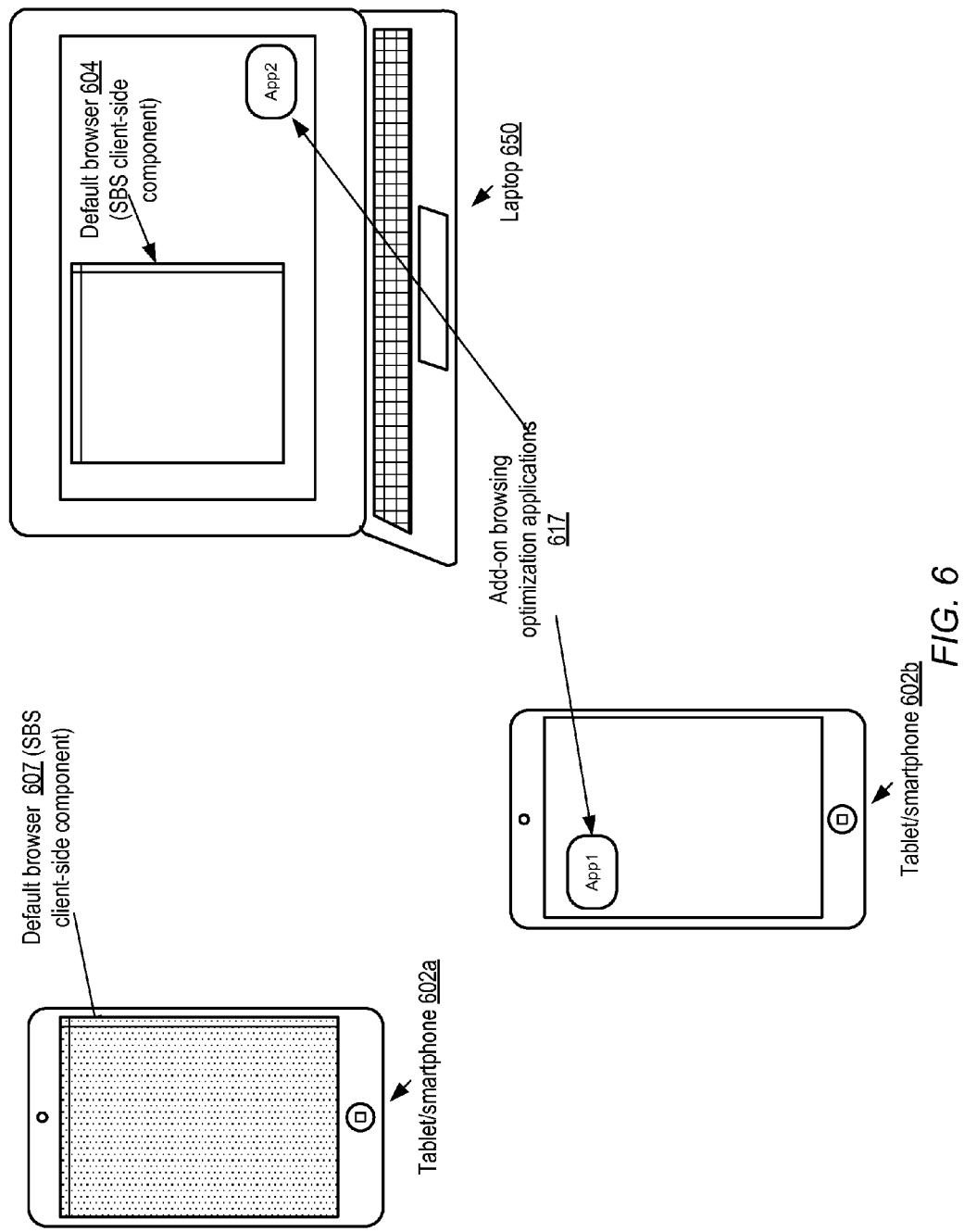
FIG. 6 illustrates examples of client computing devices for which browsing routing optimization may be enabled, according to at least some embodiments.

FIG. 6 illustrates examples of client computing devices for which browsing routing optimization may be enabled, according to at least some embodiments. In some embodiments, the SBS client-side component may comprise the default or built-in browser 607 of a client computing device such as a smartphone or tablet device 602*a*. That is, the end user may not necessarily have to install any software on their device (or even make any configuration changes, depending on the default security settings of the built-in browser) to benefit from the CDN's routing expertise in such embodiments. Similarly, the SBS client-side component may comprise the default browser application 604 pre-installed on laptops 650 and/or desktop computers in some embodiments.

In at least some embodiments, end-users may have to install non-default applications or browser add-ons to obtain the benefits of utilizing the CDN's routing knowledge base for their browsing requests. Thus, on device 602*b*, a tablet/smartphone application "App1" may be downloaded (or copied from a peripheral storage device) and installed in order to activate route optimizations of the kinds described above. The application may be downloaded from a network-accessible application store operated by a vendor of the device operating system, for example. Similarly, an application App2 or browser extension may be downloaded and installed on laptop 650 in some embodiments to activate the routing optimization techniques. In at least one embodiment, the client devices at which SBS client-side components or browser add-ons are installed may include wearable computing devices such as smart watches, smart eyeglasses, smart clothing and the like.

It is noted that in at least one embodiment, using applications or browser add-ins, the CDN edge-node based routing optimizations may be performed even if a split browser service is not implemented. That is, with the appropriate configuration settings and/or software installation at a client device, requests from any web browser running on the client device may be directed to a nearby CDS edge node. The CDS edge node may then utilize the CDN's routing knowledge base to select a route to direct content requests to the appropriate content source or sources, such as one or more origin servers. Respective connections may be established to the content source(s), and requests to retrieve the contents may be sent using the selected routes. At least some content components retrieved from the content source may be passed on to the client device without caching the components at the CDN cache. In this mode of operation, as in the RSO mode of operation, the CDN may be used primarily for its routing expertise rather than primarily for caching.

Methods of Utilizing CDN Routing Information for Enhanced Browsing

Figure 7:
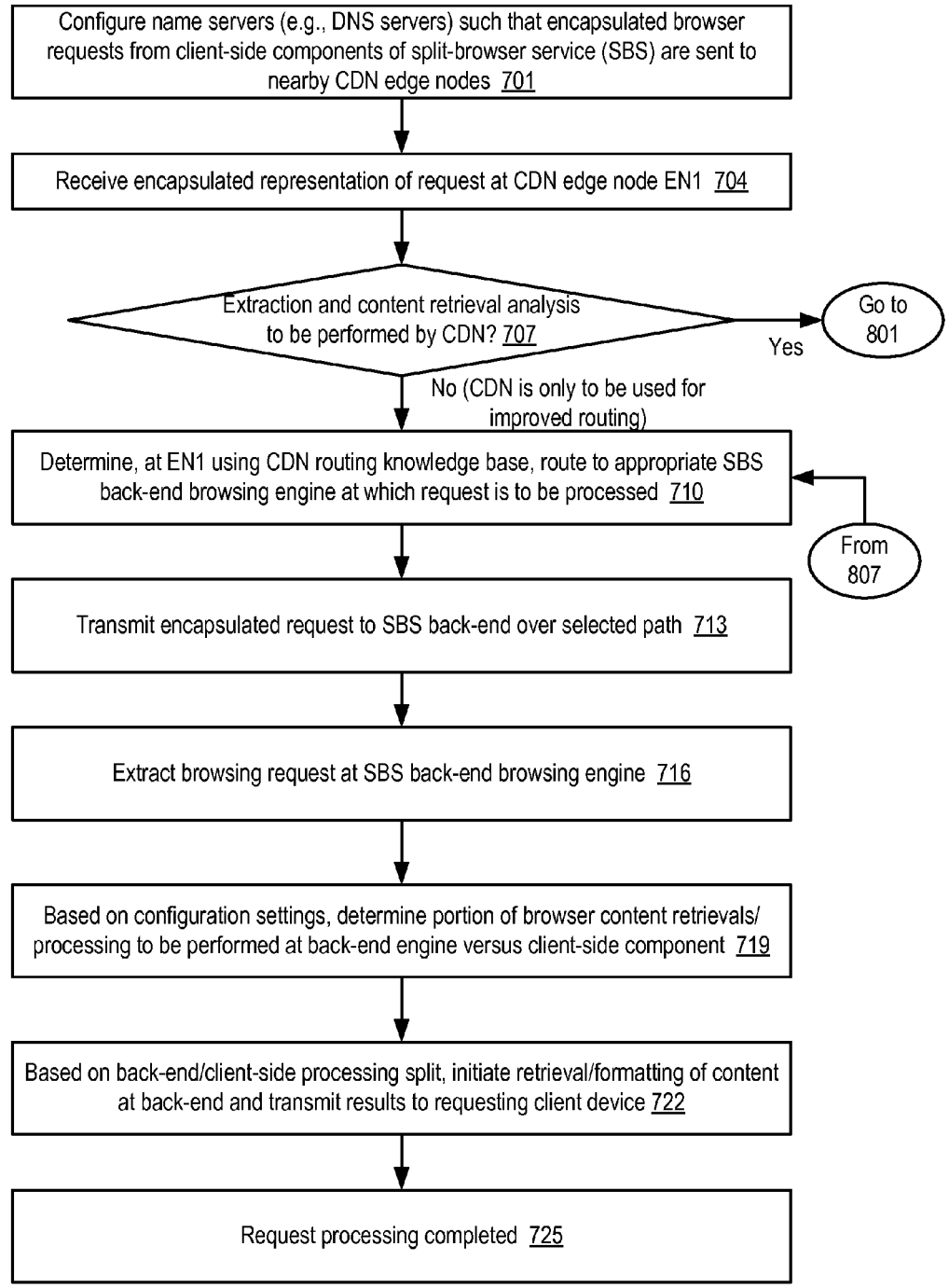
FIG. 7 is a flow diagram illustrating aspects of operations that may be performed to improve routing decisions for browser-requested content using a CDN's routing knowledge base, according to at least some embodiments.

FIG. 7 is a flow diagram illustrating aspects of operations that may be performed to improve routing decisions for browser-requested content using a CDN's routing knowledge base, according to at least some embodiments. As shown in element 701, in a preliminary step, the appropriate set of name servers (e.g., various DNS servers) may be configured such that browsing requests from client-side components of a split-browser service (such as browser applications on tablets, laptops, smartphones and the like) are directed initially to nearby edge nodes of a CDN service.

An encapsulated representation of a browsing request generated by an end user may subsequently be received at a CD edge node EN1 (element 704). A determination may be made as to whether the request is to extracted at the edge node EN1 from the encapsulated representation for at least an initial stage of content retrieval analysis (e.g., based on some combination of configuration settings at the CDN, header field values of the encapsulated request, the availability at EN1 of keys/credentials needed to extract the browsing request, and/or other factors). If the request is not to be extracted at EN1 from its encapsulated representation (as determined in element 707), e.g., if EN1 is to operate in route-selection-only (RSO) mode for the request, at least a portion of a route to a back-end node of the split browser service at which the request is to be processed may be identified using the CDN's routing knowledge base (element 710). As mentioned earlier, in some embodiments the request may be encrypted at several levels—e.g., using one set of keys/credentials based on a security protocol used by a first content source, and a second set of keys/credentials in accordance with an encapsulation protocol of the split-browser service. If EN1 does not have all the keys/credentials necessary for fully decrypting the request in some embodiments, the RSO mode may be selected, e.g., even if partial decryption is possible using keys/credentials available at EN1. If the request is to be extracted and analyzed at EN1 (as also determined in element 707), the operations illustrated in FIG. 8 may be performed.

In RSO mode, the specific SBS browsing engine to which the request is to be directed may be indicated in the request itself, or may be determined using configuration settings accessible by the CDN edge nodes. In some cases the edge node EN1 may select a particular browsing engine, e.g., based on any of various factors such as the identity or network address of the client, the current traffic conditions between EN1 and various browsing engines, recent workload metrics of different browsing engines, and so on. The encapsulated request may be transmitted to the targeted SBS back-end node (element 713) from EN1 along the route selected using the knowledge base.

At the SBS back-end browsing engine, the browsing request may be extracted from its encapsulated representation (element 716). Based at least in part on configuration settings of the SBS for the client session or for the client device, the division of the work required to render the results of the browsing request (e.g., content component retrieval, script processing, block generation, layout generation etc.) between the front-end and back-end may be determined (element 719). For example, depending on the web page or pages being accessed, some or all of the kinds of retrieval and processing tasks illustrated in FIG. 2 may be performed at the browsing engine of the SBS back-end, while the remaining may be performed at the client-side component. The portion of the content retrieval/processing for which the SBS back-end is responsible may then be performed (element 722), and the results may be provided to the client-side component to complete the request processing (element 725).

Figure 8:
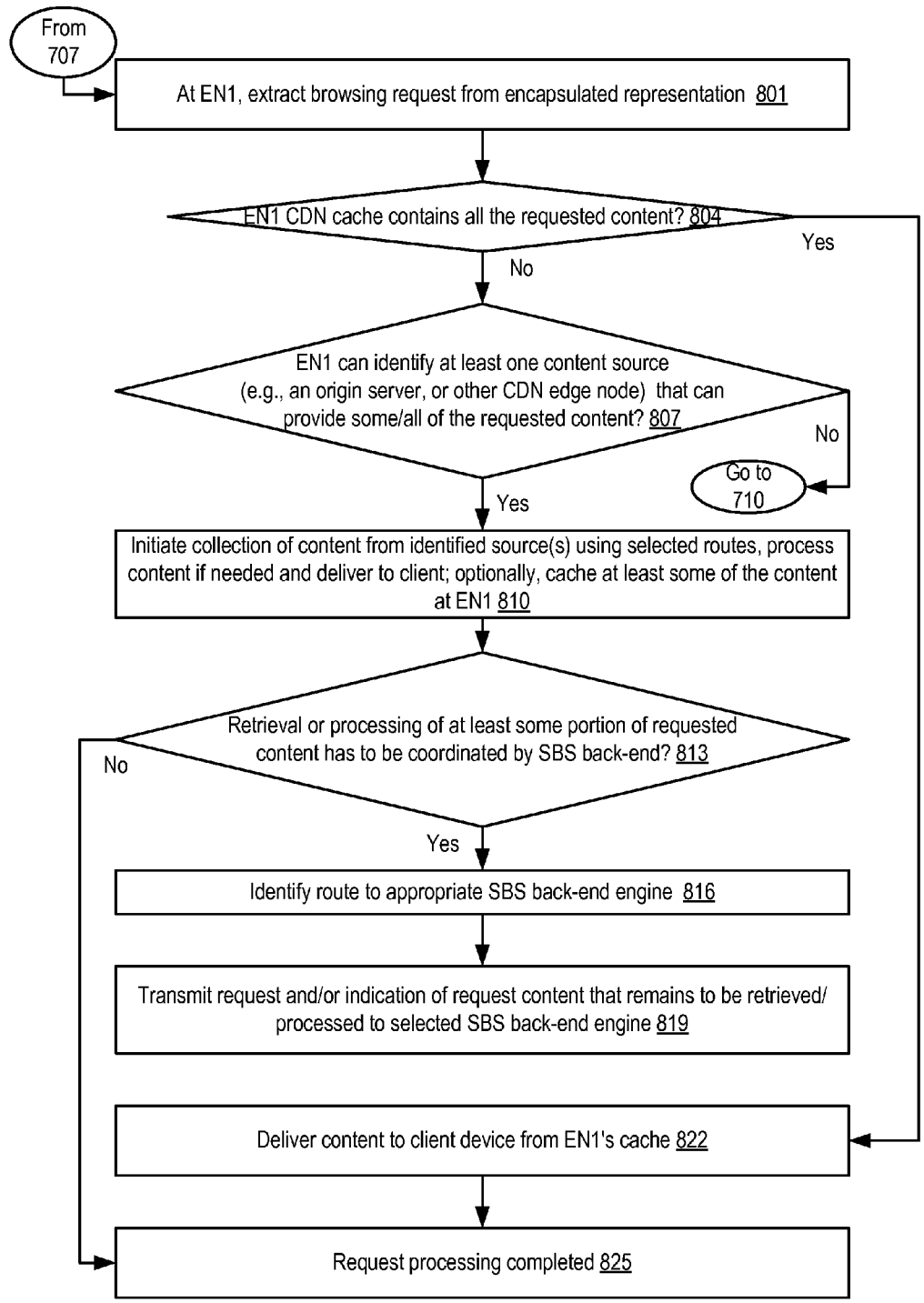
FIG. 8 is a flow diagram illustrating aspects of operations that may be performed at a CDN edge node in response to an encapsulated browsing request for which the CDN edge node is permitted to perform content retrieval analysis, according to at least some embodiments.

FIG. 8 is a flow diagram illustrating aspects of operations that may be performed at a CDN edge node in response to an encapsulated browsing request for which the CDN edge node is permitted to perform content retrieval analysis, according to at least some embodiments. Element 801 of FIG. 8 may be reached after a determination is made in operations corresponding to element 707 of FIG. 7 that EN1 is to operate in CRA mode for a browsing request. As indicated in element 801, the browsing request may be extracted at EN1 from its encapsulated representation. EN1 may first check whether all the requested content components are available in EN1's own CDN cache. If all requested components are found in the cache (as determined in element 804), they may be delivered to the client device (element 822) and the request processing may be considered complete (825).

If at least some of the content components requested are not available in EN1's cache, EN1 may try to identify at least one other content source from which the contents can be retrieved (element 810). Such content sources may, for example, include one or more origin servers at content generation networks, one or more other CDN edge nodes that may have some of the requested content cached, and so on. If such a content source or sources is found, EN1 may retrieve the corresponding content components from the content source(s) using routes selected based on the CDN's knowledge base (element 810) and transmit the content (together with any of the requested content components that were found in EN1's own cache) to the client device. Respective connections may be established to each of the content sources as needed from EN1. Some or all of the retrieved content components may be added to EN1's own cache in one embodiment.

If EN1's cache does not contain all the requested content, and EN1 cannot identify all the content sources to respond to the browsing request (as also determined in element 807), EN1 may simply transmit the request to an SBS back-end node, and operations similar to those illustrated in elements 710 onwards of FIG. 7 may be performed at the back-end node. Furthermore, even in the case that EN1 is able to obtain some of the requested content, it may be that not all of the request processing or content retrieval can be completed at EN1; that is, an SBS back-end node may have to be used for at least some portion of the work required to respond to the client's request. If a determination is made that retrieval and/or processing of at least some of the requested content is to be performed at an SBS browsing engine (element 813), a route to such a browsing engine may be identified using the CDN's routing knowledge base (element 816). The request (or an indication of the yet-to-be-completed processing/retrieval tasks thereof) may be transmitted to the SBS browsing engine using the selected path (element 819). The SBS browsing engine may then perform the necessary remaining retrieval and/or processing to fulfil the request. If EN1 was able to complete all the retrieval and/or processing tasks itself or with the help of other content sources (as also determined in element 813), the request processing may be considered complete (element 825).

It is noted that in various embodiments, operations other than those illustrated in the flow diagram of FIGS. 7, and 8 may be used to implement the techniques of using CDN routing expertise and/or knowledge to improve browsing experience. Some of the operations shown may not be implemented in some embodiments or may be implemented in a different order, or in parallel rather than sequentially. It is also noted that for certain types of browsing requests, such as requests for SSL/TLS-encrypted data, the CDN edge nodes may have no option but to forward the encapsulated requests on to the SBS back-end layer in at least some embodiments, and the SBS back-end layer may in turn simply forward such requests to the targeted origin server(s). In at least one embodiment, as mentioned earlier, CDN-knowledge-based route optimization techniques similar to those illustrated in FIGS. 7 and 8 may be used even if a split browsing service is not being used—e.g., a browser add-on or proxy may simply direct a client browsing request from the client device to a nearby CDN edge node, and the CDN edge node may find better routes to transmit the request and retrieve the data than may be found if the CDN were not used.

Use Cases

The techniques described above, of directing browsing requests to edge nodes of a CDN service for route optimization and/or content retrieval analysis purposes may be useful in a variety of environments. As more and more content is migrated to the web, and diverse scripting techniques are used ever more frequently by web page designers, the processing of web pages has become more complex. At the same time, a large fraction of browsing requests originate at relatively low-performance client devices such as smart phones and tablets, which could benefit from offloading some of the processing required to collect web content components, process scripts, and assemble the content for display. Meanwhile, routing decisions that impact the browsing experience may be made opaquely and without accountability to the end users. Provider network operators that implement split-browser services may be able to utilize routing knowledge that is already being collected by CDN services (e.g., for the CDN service's primary role of caching web content from various sources) to improve web page loading response times substantially. If CDN edge nodes are used to route the browsing requests and/or responses, the browsing-related traffic may pass through much more performant paths than may be possible without using CDNs to reach the split-browser back-end layer or to reach origin servers. Even end-users that use commodity browsers rather than split-browsing services may be able to benefit from the CDN routing knowledge base for at least some types of browsing requests.

Illustrative Computer System

Figure 9:
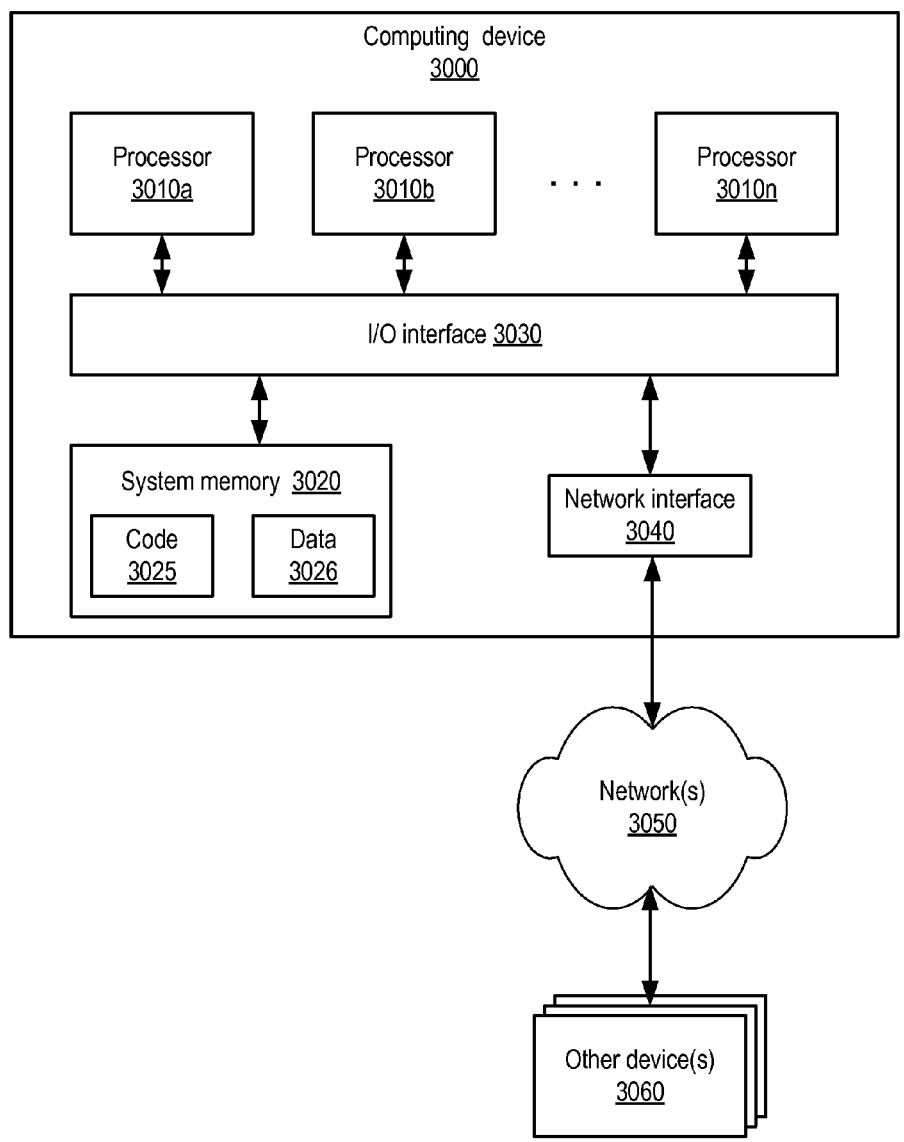
FIG. 9 is a block diagram illustrating an example computing device that may be used in at least some embodiments.

In at least some embodiments, a server that implements a portion or all of one or more of the technologies described herein, including the techniques to implement the CDN edge nodes and the client-side and server-side components of the split browser service may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
receive, at an edge node of a content delivery network (CDN) service, an encapsulated representation of a browsing request generated at a client browsing device, wherein the client browsing device implements a client-side component of a split-browser service, and wherein the split-browser service includes one or more server-side browsing engines of a provider network;
determine, at the edge node, whether the browsing request is to be extracted from the encapsulated representation for at least an initial stage of content retrieval analysis at the edge node;
in response to a determination that the browsing request is not to be extracted for the initial stage of content retrieval analysis at the edge node,
identify, at the edge node, using a routing knowledge base available to the CDN service, at least a portion of a network route to a selected server-side browsing engine;
transmit, from the edge node via the at least a portion of the network route, the encapsulated representation of the browsing request to the selected server-side browsing engine;
extract, at the selected server-side browsing engine, the browsing request from the encapsulated representation; and
initiate, based at least in part on a configuration setting associated with the client browsing device, one or more content retrieval operations from the selected server-side browsing engine to respond to the browsing request.

2. The system as recited in claim 1, wherein the one or more computing devices are further configured to:
receive, at the edge node of the CDN service, a representation of a second browsing request from a second client browsing device;
determine, at the edge node, that at least an initial stage of content retrieval analysis of the second browsing request is to be performed at the edge node;
identify, during the initial stage of content retrieval analysis, at least a first content source other than the edge node that is to be used to respond to the second browsing request;
initiate an establishment of a first connection to the first content source on behalf of the second browsing request; and
retrieve at least one content element from the first content source via the first connection.

3. The system as recited in claim 1, wherein the one or more computing devices are further configured to:
receive, at the edge node of the CDN service, a representation of a second browsing request from a second client browsing device;
determine, at the edge node, that at least an initial stage of content retrieval analysis of the second browsing request is to be performed at the edge node;
identify, within a content cache maintained at the edge node, a particular content element corresponding to at least one resource identifier indicated in the second browsing request; and
transmit, to the second client browsing device, the content element from the edge node.

4. The system as recited in claim 1, wherein the one or more computing devices are further configured to:
perform a cryptographic analysis to determine, at the edge node, whether the browsing request is to be extracted from the encapsulated representation.

5. The system as recited in claim 1, wherein the one or more computing devices are further configured to:
examine a configuration setting at the edge node to determine whether the browsing request is to be extracted from the encapsulated representation.

6. A method, comprising:
performing, by one or more computing devices:
receiving, at an edge node of a content delivery network (CDN) service, a representation of a browsing request generated at a client browsing device, wherein the client browsing device implements a client-side component of a split-browser service, wherein the split-browser service includes one or more server-side browsing engines of a provider network;

determining, at the edge node, whether at least an initial stage of content retrieval analysis of the browsing request is to be performed at the edge node;

in response to determining that the initial stage of content retrieval analysis of the browsing request is not to be performed at the edge node, transmitting, from the edge node via a network route identified using a routing knowledge base of the CDN service, the representation of the browsing request to a selected server-side browsing engine of the one or more server-side browsing engines; and initiating, based at least in part on a configuration setting associated with the client browsing device, one or more content retrieval operations from the selected server-side browsing engine to respond to the browsing request.

7. The method as recited in claim 6, wherein the representation is generated at the client-side component in accordance with an encapsulation protocol of the split-browser service.

8. The method as recited in claim 6, wherein said determining at the edge node that the initial stage of content retrieval analysis is not to be performed at the edge node comprises performing a cryptographic analysis of the representation.

9. The method as recited in claim 6, wherein said determining at the edge node that the initial stage of content retrieval analysis is not to be performed at the edge node comprises examining a configuration setting at the edge node.

10. The method as recited in claim 6, further comprising performing, by the one or more computing devices:

receiving, at the edge node of the CDN service, a representation of a second browsing request from a second client browsing device;

determining, at the edge node, that at least an initial stage of content retrieval analysis of the second browsing request is to be performed at the edge node;

identifying, within a content cache maintained at the edge node, a particular content element corresponding to at least one resource identifier indicated in the second browsing request; and transmitting, to the second client browsing device, the content element from the edge node.

11. The method as recited in claim 6, further comprising performing, by the one or more computing devices:

receiving, at the edge node of the CDN service, a representation of a second browsing request from a second client browsing device;

determining, at the edge node, that at least an initial stage of content retrieval analysis of the second browsing request is to be performed at the edge node;

identifying, during the initial stage of content retrieval analysis, at least a first content source other than the edge node that is to be used to respond to the second browsing request;

initiating an establishment of a first connection to the first content source on behalf of the second browsing request; and retrieving at least one content element from the first content source via the first connection.

12. The method as recited in claim 11, wherein the first content source comprises a different edge node of the CDN service.

13. The method as recited in claim 11, wherein the first content source comprises an origin server hosting a content element corresponding to a resource identifier indicated in the second browsing request.

14. The method as recited in claim 11, further comprising performing, by the one or more computing devices:

identifying, during the initial stage of content retrieval analysis, a second content source from which a particular content element is to be retrieved in response to the second browsing request;

determining, prior to a retrieval of the particular content element from the second content source in response to the second browsing request, that an estimated probability of meeting a performance criterion associated with retrieval of the particular content element from a third content source is above a threshold; and initiating an establishment of a connection to the third content source on behalf of the second browser request.

15. The method as recited in claim 6, wherein the one or more browsing engines comprise a plurality of server-side browsing engines, further comprising performing, by the one or more computing devices:

receiving, at the edge node of the CDN service, a representation of a second browsing request from a second client browsing device;

determining, at the edge node, that at least an initial stage of content retrieval analysis of the second browsing request is to be performed at the edge node; and selecting, at the edge node, a particular server-side browsing engine to be used for the second browsing request from among the one or more browsing engines based at least in part on the initial stage of content retrieval analysis.

16. A non-transitory computer-accessible storage medium storing program instructions that when executed on one or more processors implements an edge node of a CDN service, wherein the edge node is configured to:

receive a representation of a browsing request generated at a client browsing device, wherein the client browsing device implements a client-side component of a split-browser service, wherein the split-browser service includes one or more server-side browsing engines;

determine whether at least an initial stage of content retrieval analysis of the browsing request is to be performed at the edge node;

in response to a determination that the initial stage of content retrieval analysis of the browsing request is not to be performed at the edge node, transmit, from the edge node via a network route identified using a routing knowledge base of the CDN service, the representation of the browsing request to a selected server-side browsing engine of the one or more server-side browsing engines.

17. The non-transitory computer-accessible storage medium as recited in claim 16, wherein the representation is generated at the client-side component in accordance with an encapsulation protocol of the split-browser service.

18. The non-transitory computer-accessible storage medium as recited in claim 16, wherein the edge node is further configured to:

perform a cryptographic analysis of the representation to determine that the initial stage of content retrieval analysis is not to be performed at the edge node.

19. The non-transitory computer-accessible storage medium as recited in claim 18, wherein to perform the cryptographic analysis, the edge node is further configured to:

utilize a first set of one or more keys to extract an intermediate version of the browsing request;

determine that at least a portion of the intermediate version is encrypted; and determine whether a second set of one or more keys to be used to decrypt the portion of the intermediate version is available at the edge node.

20. The non-transitory computer-accessible storage medium as recited in claim 16, wherein the edge node is further configured to:

receive a representation of a second browsing request from a second client browsing device;

determine that at least an initial stage of content retrieval analysis of the second browsing request is to be performed at the edge node;

identify, within a content cache maintained at the edge node, a particular content element corresponding to at least one resource identifier indicated in the second browsing request; and transmit, to the second client browsing device, the content element from the edge node.

21. The non-transitory computer-accessible storage medium as recited in claim 16, wherein the edge node is further configured to:

receive a representation of a second browsing request from a second client browsing device;

determine that at least an initial stage of content retrieval analysis of the second browsing request is to be performed at the edge node;

identify, during the initial stage of content retrieval analysis, at least a first content source other than the edge node that is to be used to respond to the second browsing request;

initiate an establishment of a first connection to the first content source on behalf of the second browsing request; and retrieve at least one content element from the first content source via the first connection.

22. The non-transitory computer-accessible storage medium as recited in claim 16, wherein the client browsing device comprises one of: (a) a smartphone, (b) a tablet computing device, (c) a laptop computer, (d) a desktop computer, or (e) a wearable computing device.

* * * * *